Feb. 2, 1926.

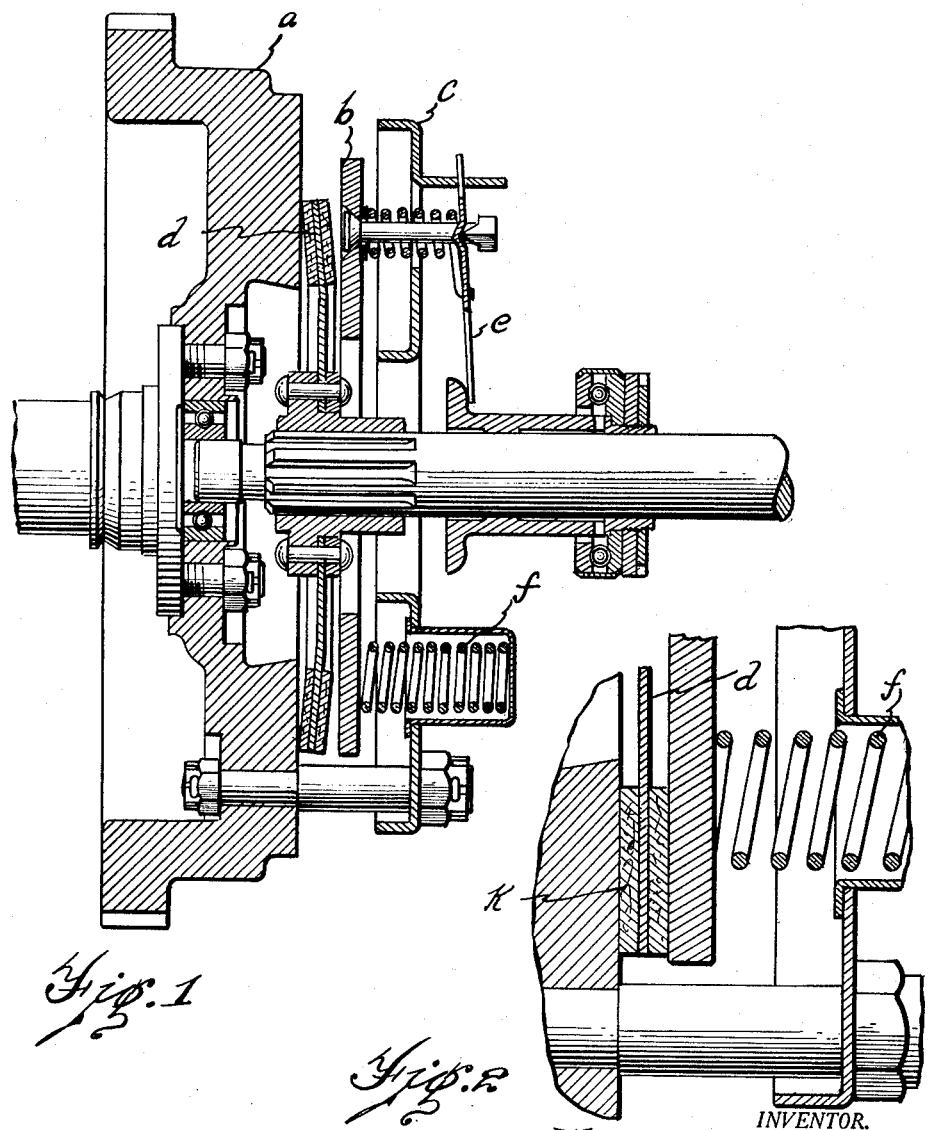

E. E. WEMP

CLUTCH DISK

Filed July 25, 1924

1,571,747

INVENTOR.
Ernest E. Wemp.

BY Stuart C. Barnes
ATTORNEY.

Patented Feb. 2, 1926.

1,571,747

UNITED STATES PATENT OFFICE.

ERNEST E. WEMP, OF DETROIT, MICHIGAN.

CLUTCH DISK.

Application filed July 25, 1924. Serial No. 728,056.

*To all whom it may concern:*

Be it known that I, ERNEST E. WEMP, a citizen of the United States, residing at Detroit, in the county of Wayne and State of Michigan, have invented certain new and useful Improvements in Clutch Disks, of which the following is a specification.

This invention relates to clutch disks and especially to a driven disk intended for use in a multiple disk or in a single plate clutch.

It is the object of the invention to provide a disk which will progressively increase its area of contact as the clutch is let in and which requires distortion in two directions in packing the disks together. This results in a greater resistance to the increase of the area of contact, and consequently lets the clutch in easier for a given weight of disk than a clutch disk which requires distortion in only one direction, as is the case in my twisted spoke construction described and claimed in my application, Serial No. 693,054, which has matured into Patent No. 1,541,883.

In the drawings:

Fig. 1 is a cross section through the clutch showing a single plate clutch.

Fig. 2 is an enlarged fragmentary section showing the disks packed.

Figures 3, 4, 5:
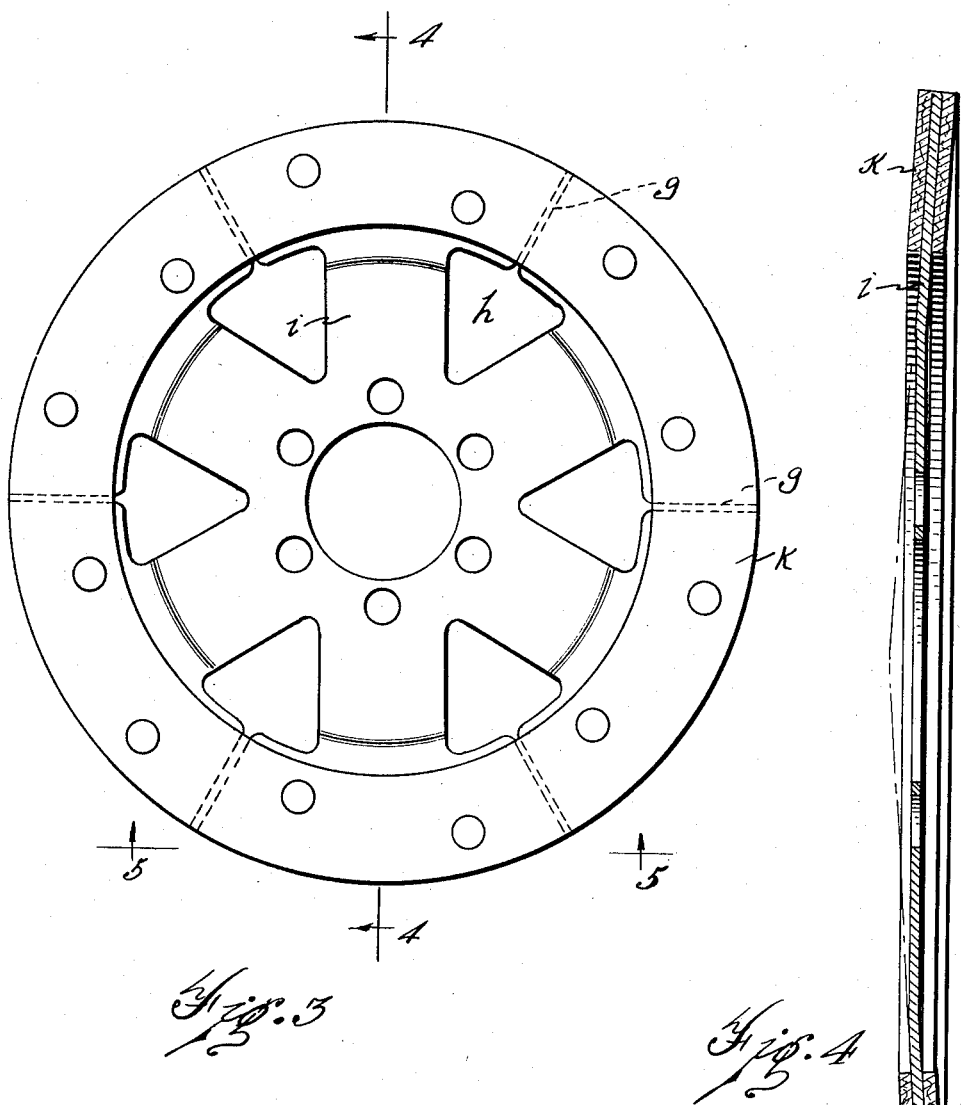
Fig. 3 is an elevation of the disk.
Fig. 4 is a section on the line 4—4 of Fig. 3.
Fig. 5 is a section on the line 5—5 of Fig. 3.

$a$ designates the fly wheel, the rear face of which forms one of the driving disks. $b$ is the packing ring and also forms one of the driving disks. $c$ is the clutch cover and $d$ the driven disk. Coil springs $f$ serve to exert a direct pressure in packing the disks and the levers $e$ serve to relieve the spring pressure when one desires to disengage the clutch parts. However, the exact construction of the clutch, whether multiple disk or the so-called single plate type, or whether direct pressure or indirect pressure is wholly immaterial as far as my improved disk construction is concerned.

The driven disk $d$ is preferably a spoked type, that is slots $g$ running in from the periphery of the disk are enlarged as at $h$ to form the spokes $i$. This construction tends to distribute the bending stresses along the entire length of the spoke rather than at the base of the same, thereby improving the durability of the spoke and also the action.

The center of the disk is flat, the outer zone of the disk beginning, say about one-third of the way in on the spokes, and running to the periphery is the section of a cone or conoidal. There is a deflection from the flat surface of the center of about three degrees. However, the number of degrees and the exact location of the conoidal section is more or less immaterial; in fact the entire disk might be formed on a cone, although I prefer to have the center flat.

With such a disk, when the spring is released, the disk contacts first at the edges, as shown in Fig. 1, and then the parts will sort of roll in as the packing force overcomes the resistance of the disk to being flattened. This resistance is relatively great for a given gauge of disk, for the reason that the disk not only has to be flattened about the axis which is a chord of the disk, but the disk has to be flattened along the radial axis, as will be apparent from an inspection of Fig. 5 which is a section on a chord of the disk, and which shows that the disk is also bowed along the chord, hence the disk so constructed offers a considerable resistance to flattening which delays the action and consequently makes the engagement and disengagement less abrupt and easier.

I prefer using continuous clutch facings $k$ on each side of the disk; they are riveted to the disk.

What I claim is:

1. A clutch disk for use in the plate type of clutch comprising a spoked metal disk in which the spokes terminate at their ends with packing portions in the form of segments of cones.

2. A clutch disk comprising a web divided into segments each comprising a spoke which can flex by bending along its length and provided at its end with an enlarged portion formed as a portion of a cone and which is caused to flatten when the disk is subjected to pressure.

3. A clutch disk comprising a metal disk divided into segments which are distorted from a flat condition and which require distortion of the metal on two perpendicular axes in order to flatten the disk in packing the same.

4. A clutch disk for plate clutches comprising a slotted disk having the center flat and the outer zone formed as a section of a cone and arranged for packing between other plates.

5. A clutch disk adapted for use in plate clutches comprising a metal disk having inwardly directed slots enlarged towards the center to form spokes and having the outer packing zone of the disk formed on a section of a cone.

6. A clutch disk comprising a metal plate divided into spoked portions having enlarged rim portions; the latter slightly convexo-concave.

In testimony whereof I have affixed my signature.

ERNEST E. WEMP.